US011568383B2

(12) United States Patent
Colepicolo et al.

(10) Patent No.: US 11,568,383 B2
(45) Date of Patent: Jan. 31, 2023

(54) METHOD AND APPARATUS FOR A PAYMENT NETWORK

(71) Applicant: Zunify, Inc., Los Angeles, CA (US)

(72) Inventors: Juan Ignacio Monge Colepicolo, Alajuela (CR); Luis Javier Herrera Espinoza, Alajuela (CR); Luis Alonso Conejo Chaves, Alajuela (CR)

(73) Assignee: Zunify, Inc., Los Angeles, CA (US)

( * ) Notice: Subject to any disclaimer, the term of this patent is extended or adjusted under 35 U.S.C. 154(b) by 0 days.

(21) Appl. No.: 17/069,390

(22) Filed: Oct. 13, 2020

(65) Prior Publication Data

US 2021/0110376 A1    Apr. 15, 2021

Related U.S. Application Data

(60) Provisional application No. 62/913,637, filed on Oct. 10, 2019.

(51) Int. Cl.
| | | |
|---|---|---|
| G06Q 20/32 | (2012.01) | |
| G06Q 20/20 | (2012.01) | |
| G06Q 20/40 | (2012.01) | |
| G06Q 20/42 | (2012.01) | |
| G06K 7/14 | (2006.01) | |
| G06Q 20/08 | (2012.01) | |
| G06Q 20/10 | (2012.01) | |
| G06Q 40/02 | (2012.01) | |

(Continued)

(52) U.S. Cl.
CPC ....... G06Q 20/3276 (2013.01); G06K 7/1417 (2013.01); G06Q 20/202 (2013.01); G06Q 20/401 (2013.01); G06Q 20/42 (2013.01); G06Q 20/023 (2013.01); G06Q 20/085 (2013.01); G06Q 20/1085 (2013.01); G06Q 20/326 (2020.05); G06Q 20/367 (2013.01); G06Q 20/4037 (2013.01); G06Q 40/02 (2013.01); G06Q 2220/00 (2013.01)

(58) Field of Classification Search
CPC ............ G06Q 20/3276; G06Q 20/202; G06Q 20/401; G06Q 20/42; G06Q 20/023; G06Q 20/085; G06Q 20/1085; G06Q 20/326; G06Q 20/367; G06Q 20/4037; G06Q 40/02; G06Q 2220/00; G06K 7/1417
USPC ........................................................ 705/21
See application file for complete search history.

(56) References Cited

U.S. PATENT DOCUMENTS

| | | | |
|---|---|---|---|
| 2014/0201100 A1* | 7/2014 | Rellas | G06Q 30/0607 705/330 |
| 2021/0065471 A1* | 3/2021 | Giraudo | G06Q 20/325 |

* cited by examiner

*Primary Examiner* — Garcia Ade
(74) *Attorney, Agent, or Firm* — Foundation Law Group LLP; J D Harriman

(57) ABSTRACT

The present system is a payment network that implements an ecosystem in which banks can issue financial products (e.g. credit cards, debit cards, and the like) and customers are able to pay in any commerce without the need for card association networks. The streamlined nature of the system allows interchange fees to be substantially reduced over current systems. In addition, the system is all digital, so that physical security features are not required. The system provides an application for a customer that can be used on a mobile phone or other computing device, downloadable point-of-sale (POS) applications that can be used for commerce, and a web based POS application for commerce. The customer application includes a marketplace and an e-wallet in one embodiment. The customer can use the marketplace to acquire and link financial products produced by the banks with the customer's e-wallet.

7 Claims, 5 Drawing Sheets

(51) Int. Cl.
*G06Q 20/02* (2012.01)
*G06Q 20/36* (2012.01)

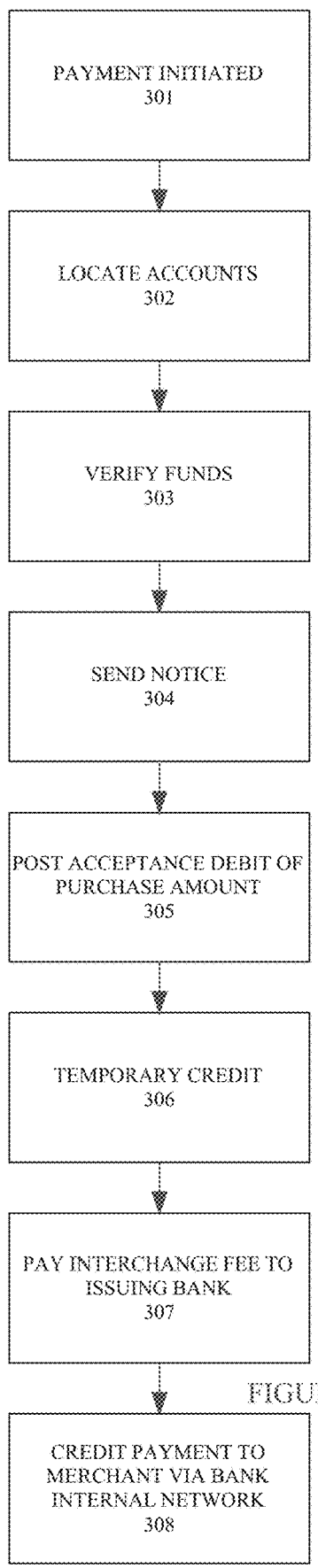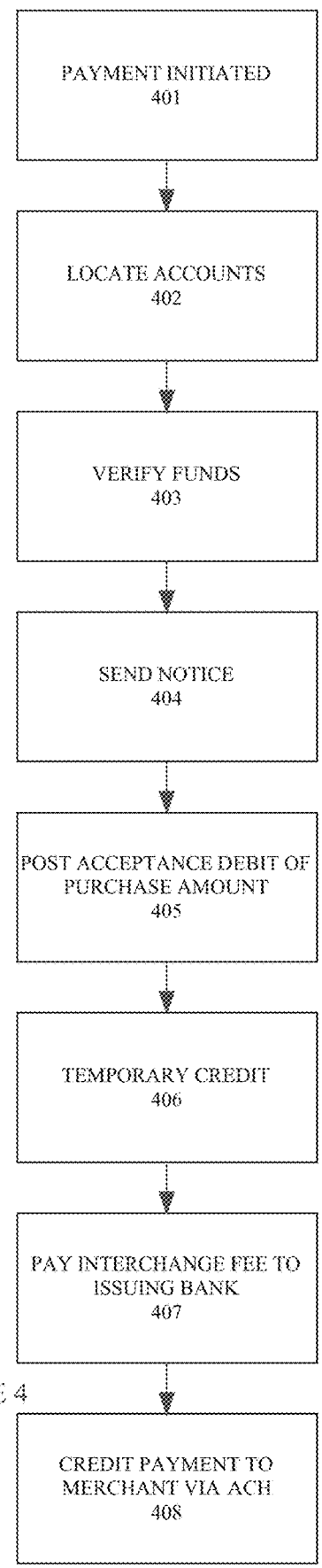
FIGURE 3
FIGURE 4

METHOD AND APPARATUS FOR A PAYMENT NETWORK

This patent application claims priority to U.S. Provisional Patent Application 62/913,637 filed on Oct. 10, 2019, which is incorporated by reference herein in its entirety.

BACKGROUND OF THE SYSTEM

Credit cards are provided by an Issuing Bank to customers. When a customer makes a purchase from a merchant with the credit card, the Issuing Bank funds the purchase by transferring the purchase price to the Merchant Bank (the bank used by the merchant who made the sale). The Merchant Bank is sometimes referred to as the Acquiring Bank. In some cases, an Acquiring Company is used in lieu of the Merchant Bank. The Merchant Bank pays a fee to the Issuing Bank in return for this service. This fee is referred to as the "Interchange Fee". The Merchant Bank then pays the merchant an amount that represents the sales price minus the Interchange Fee as well as additional fees such as a discount rate, add-on, or pass-through.

Currently, the interchange fees are increasing in a way that discourages the implementation of electronic payment mechanisms. The rise in these fees increases the merchants' discount rates or processing fees, discourages the acceptance of card payments, and generates an imbalance in competitiveness among financial institutions. These percentages may vary depending on the region and the regulations. For example, contactless cards (e.g. RFID, scanned symbols, etc.) may have a lower interchange fee than a card that is processed using the magnetic stripe. Debit cards may have a lower interchange rate than credit cards. Electronic ID may have a lower rate than use of a PIN or signature.

In the US, interchange fees are determined by card association networks and can range between 0.05% and 2.95% per transaction. In Europe, interchange rates are regulated by European Parliament and have caps of 0.2% for debit cards and 0.3% for credit cards. In Central America, rates can very between 1% and 4%, with some businesses paying discount rates of up to 8% per transaction.

Although technology has brought about efficiencies in the credit market, mobile technology has led to a proliferation of intermediaries in the payment process. FIG. 1 is an example of the credit ecosystem in the prior art. The system 100 includes an Issuing Bank 101 who provides a credit card to a customer. A Merchant Bank 103 receives money from a transaction and forwards funds to a merchant, minus interchange and other fees. In between the Issuing Bank 101 and Merchant Bank 103 are the Acquirers/Processors 102. These can include card networks such as Visa and Mastercard, and now, with the rise of digital and mobile technology, Virtual Cards, e-Wallets, and the like, with corresponding processing fees for one or more of those parties depending on the transaction.

In addition to the increases in Interchange Fees based on the complexity of the transaction, charges may vary based on the risk of the transaction. Credit card fraud is on the rise, so security is more important than ever. Currently, with the use of physical cards in many cases, security features rely on hardware and other physical barriers to reduce the possibility of fraud. All of this costs money and can add to the interchange fees, annual fees, processing fees, and other fees related to credit transactions.

SUMMARY

The present system is a payment network that implements an ecosystem in which banks can issue financial products (e.g. credit cards, debit cards, and the like) and customers are able to pay in commerce without the need for card association networks. The streamlined nature of the system allows interchange fees to be substantially reduced over current systems. In addition, the system is all digital, so that physical security features are not required. The system provides an application for a customer that can by used on a mobile phone or other computing device, downloadable point-of-sale (POS) applications that can be used for commerce, and a web based POS application for commerce. The customer application includes a marketplace and an e-wallet in one embodiment. The customer can use the marketplace to acquire and link financial products produced by the banks with the customer's e-wallet.

BRIEF DESCRIPTION OF THE DRAWINGS

FIG. 3 is a flow diagram illustrating the operation of the system in one embodiment where the customer and merchant have accounts in the same entity.

FIG. 4 is a flow diagram illustrating the operation of the system in one embodiment where the customer and merchant have accounts in different entities.

DETAILED DESCRIPTION OF THE SYSTEM

The system provides a unique digital model that automates the issuance and distribution of payment method by replacing physical cards and POS terminals with software products. The system can increase acquirer and issuing banks earnings automatically, in each transaction. The system reduces operation costs of issuance and acquisition, handles the affiliation, support, and maintenance of digital POS terminals, and eliminates intermediaries in the payment process.

The system customer App makes it easier for users to have all their financial products in just one place. A customer can easily link their favorite bank account, obtain a new bank account, virtual card, coupons, or other financial benefits using the system. The customer is also able to perform most common financial transactions like pay (remotely or in-person), request money, transfer money and withdraw from an Automated Teller Machine ("ATM"). The system Digital POS makes it easier to charge payments without having to install, update and maintain hardware terminal POS.

Current technology involves the use of specialized hardware to issue financial products. With the use of plastic cards, customers associate a unique identification number that is printed on the plastic or stored within the magnetic stripe and integrated chip modules. There are different mechanisms to copy or capture these identification numbers, for example, with skimming or with a photograph of both sides of the card. Thus, banks estimate that between 13% and 19% of total annual card transactions are fraudulent. Also, of that total percentage, the purchases with the highest risk are related to online or card-not-present payments. The user's confidential information, from credit card number to CVV number, to PIN, etc. are exposed and at risk during every transaction, whether at a physical location or on-line.

By contrast, the present system implements a digital technology that unifies payments in both physical and online stores within the same ecosystem. Without the use of plastic or metal cards, the system does not associate a customer with a static identification number that can be stolen or compromised. Instead, the system encrypts the identity of a user and associates that with different virtual tokens that are never shared. Unlike the prior art, in the present system the merchant does not receive confidential information from the customer during a transaction. The system itself acts as a trusted entity that validates the transaction point-to-point. By never sharing customer information in the open, the risk of fraud is dramatically decreased. The system is a unified billing and payment system.

Figure 1:
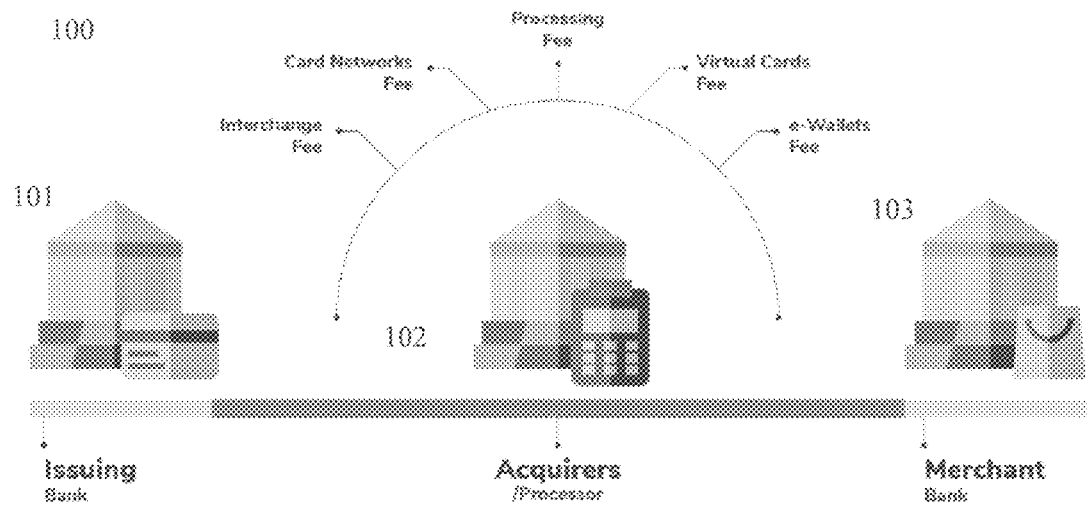
FIG. 1 is an example of a credit environment in the prior art.
Figure 2:
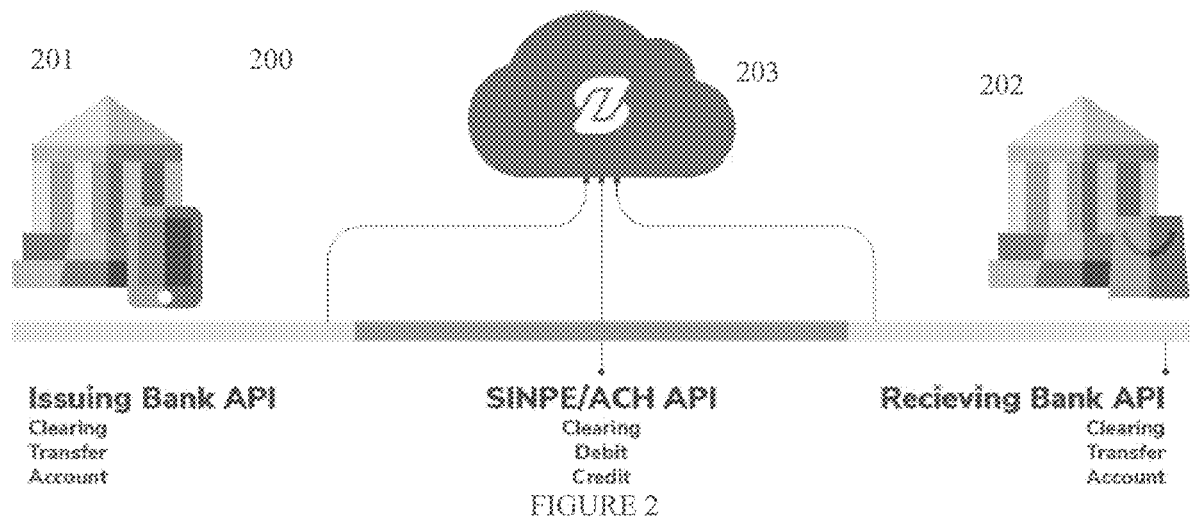
FIG. 2 is a block diagram of the system in an embodiment.

FIG. 2 is a block diagram of an embodiment of the system 200. In this embodiment, an Issuing Bank is represented by an Issuing Bank API 201. This API allows the system to provide clearing, transfers, and account processes. The system includes a Receiving Bank API 202 that also provides clearing, transfers, and account processes. The system 203 sits between API 201 and API 202 and provides clearing, debit, and credit processes. The system can work with SINPE (Sistema Nacional de Pagos Electrónicos), IBAN, and the like to implement an Automated Clearing House (ACH) functionality.

The system can work with ACH networks or their equivalent and can handle On-Us and Off-Us transactions to optimize costs, security, and speed of payments within the system. When a customer pays with the system, the system transfers funds through the system bank's internal network, the ACH platform, or a combination of both. The decision of which process to use is automatic and depends on the location of the customer and merchant's accounts. If the customer is using its own bank, this is an On-Us transaction. If the customer is using a different bank than the customer's own bank, this is an Off-Us transaction.

FIG. 3 is a flow diagram illustrating the operation of the system in one embodiment where the customer and merchant have accounts in the same entity (e.g. issuing bank), i.e. an On-Us transaction. At step 301 a transaction is initiated and a customer pays a merchant a purchase price using the system. At step 302 the system locates the customer account and the merchant account in the system databases and verifies that such accounts exist.

At step 303 the system verifies that the customer has funds and/or credit available in their account. At step 304 the system sends a notice to the merchant and to the customer that the transaction was either accepted or denied. Please note that no funds have been transferred in the system at the point of step 304, only acknowledgements and approval/denial messages. If the transaction has been accepted, the merchant can accept and finalize the transaction using its POS application. The customer can confirm the transaction using the customer application on the customer's device. When appropriate, the customer may be asked to sign (e.g. electronically).

At step 305, once the transaction has been finalized, the system debits the purchase amount from the customer's account using the common bank's internal network. At step 306 the system then credits the purchase amount to a temporary, or reserve, account using the common bank's own internal network. At step 307 the system pays an interchange fee to the issuing bank from the temporary account and debits the system processing fee. At step 308 the system credits the remainder of the payment to the merchant's account using the common bank's internal network.

FIG. 4 is a flow diagram illustrating the operation of the system in one embodiment where the customer and merchant have accounts in different entities, i.e. and Off-Us transaction. At step 401 a transaction is initiated and a customer pays a merchant a purchase price using the system. At step 402 the system locates the customer account and the merchant account in the system databases and verifies that such accounts exist.

At step 403 the system verifies that the customer has funds available in their account. At step 404 the system sends a notice to the merchant and to the customer that the transaction was either accepted or denied. Please note that no funds have been transferred in the system at the point of step 404, only acknowledgements and approval/denial messages. If the transaction has been accepted, the merchant can accept and finalize the transaction using its POS application.

At step 405, once the transaction has been finalized, the system debits the purchase amount from the customers account using the issuing bank's internal network. At step 406 the system then credits the purchase amount to a temporary, or reserve, account using the issuing bank's own internal network. At step 407 the system pays an interchange fee to the issuing bank from the temporary account and debits the system ACH processing fee. At step 408 the system credits the remainder of the payment to the merchant's account using the ACH network.

POS Application

The system provides a downloadable POS application as well as a web-based POS system for commerce. The downloadable POS is an application that can reside and be used on a desktop, laptop, tablet, smart-phone, and the like. The merchant can enter the amount to be paid into the POS application. The app then is responsible for sending the necessary data for the payment algorithm to a system server. Each device on which the POS app is installed has its own ID code which is required for the payment algorithm and the traceability of the device. The POS app generates an identifying icon, such as a QR code, bar code, and the like that is unique for the device of installation. The merchant may print out the QR code and have it ready to be scanned by the customer when a transaction is to be consummated. The customer can scan this code which will cause the system to find and use the appropriate memory location in a system server and use that location for the transaction.

Figure 6:
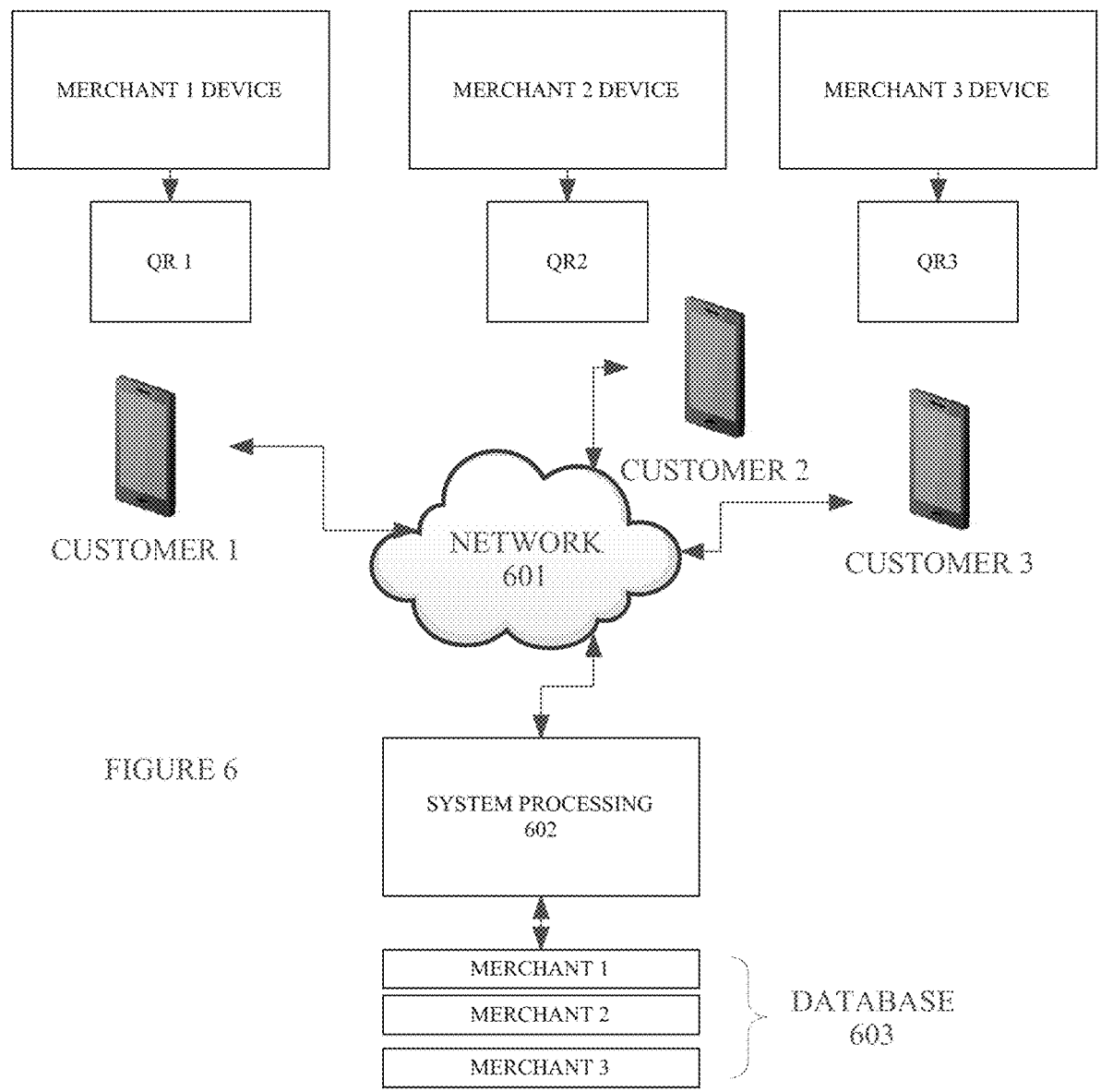
FIG. 6 illustrates the POS app structure in an embodiment.

FIG. 6 illustrates the POS app structure in an embodiment. Each merchant has a device on which they have installed the POS app, namely Merchant Device 1, Merchant Device 2, and Merchant Device 3. When the merchant initiates the POS app, the app generates a unique QR code (e.g. QR1, QR2, and QR3) that is associated with that merchant and that device, and creates a memory space in a database 603 (Merchant 1, Merchant 2, Merchant 3) associated with that QR code and that Merchant Device. The QR code does not include any information related to the merchant, the transaction, or the customer. That means that compromise of the QR code does not compromise any of the actors in the transaction. The QR code is a link, within the system, for payment authorization between the customer and the merchant.

The POS app can provide a printable pdf file of the QR code, for example, that will allow the merchant to print and to affix somewhere where a customer can easily scan the code.

When a customer wishes to make a purchase, the customer uses a mobile device (e.g. Customer 1, Customer 2, Customer 3) to scan the QR code. The customer device transmits the code through Network 601 to the system processing system 602. The system processing system 602 access database 603 and utilizes the memory space associated with that QR code to execute the transaction. The memory space is filled with the transaction information for a specified time. The transaction information is deleted if there is no transaction within the specified time or if the code is scanned and the transaction is executed.

Web POS

In one embodiment a Web POS system may be used. Instead of a static QR code as with the POS app, in the web POS the system generates a unique QR code when a transaction is initiated. In one embodiment, the system generates its own unique System Code. The QR code or the System Code does not contain any information about the merchant, the bank account, the customer, or the transaction. It is assigned randomly and has no information pattern. It links authorization of the payment authorization between the customer and the merchant within the system. It is associated with tokenized and encrypted information in the system database.

The system payment process integrates the same user experience for remote and on-site payments. In the case of on-site transactions, the customer pays when scanning the System Code shown by the merchant. In the case of remote payments or e-commerce, the system redirects the customer to a System Link within a system website or the merchant's website, which executes the payment. The customer never enters the amount of the transaction, but can accept or refuse the sale. The merchant, on the other hand, introduces the amount of the purchase and also accepts or rejects the payment.

Transaction

Figure 5:
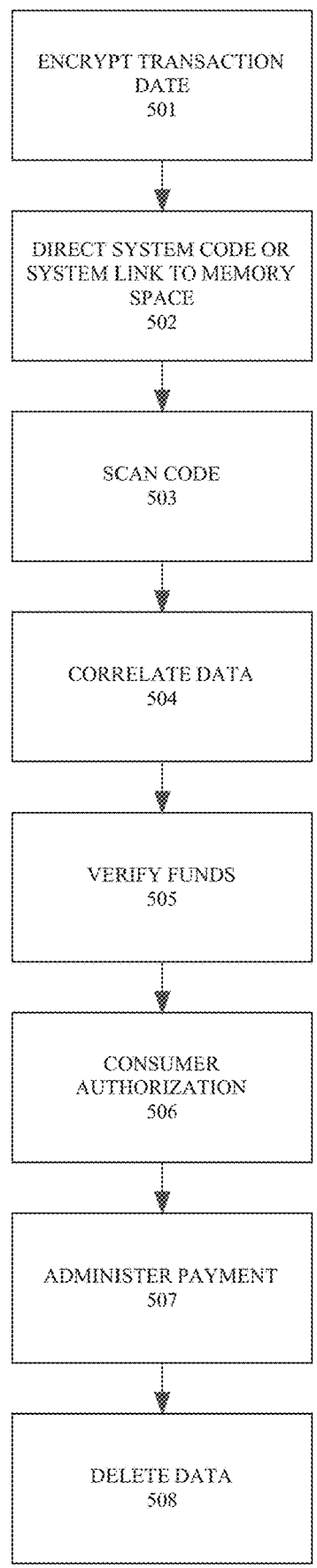
FIG. 5 is a flow diagram illustrating the payment authorization transaction in an embodiment.

FIG. 5 is a flow diagram illustrating the payment authorization transaction in an embodiment. At step 501 the amount, transaction ID, location, and time of payment are encrypted and written in memory space in the system memory. This is done by a cashier or other representative of the merchant via the merchant POS App or Web-based POS. At step 502 the system generates and directs a System Code or System Link to the memory space. This code could be the static code from the POS app or it could be a unique code generated for the transaction At step 503, the customer scans the System Code or clicks on the System Link, and the system provides the key to the memory space that will store the transaction data.

At step 504 the commerce and customer data are correlated, and the system reads the amount of the transaction. At step 505 the system verifies that the customer has sufficient funds in the selected payment account. At step 506, the system verifies the transaction prompting the customer to authorize the transaction on the customer's device.

At step 507, the system administers payment. At step 507, the system deletes data written in the memory space and it can be used for a new transaction. Customer Application As noted above, the system provides a customer application that can be used on any processing device, including smartphones, pads, laptops, smartwatches, and the like. The customer provides identifying information to the system, including full name, physical address, an identification number, photograph, contact information, bank account information, and the like. In one embodiment, the system uses biometric identification, including vision technology, to provide account access. The system may use any suitable identification process to provide access to the system, including multi-factor authorization, and the like. The Customer application may be a downloadable app resident on a mobile device or a web-based app that is accessible via a browser.

The Customer App allows the customer to add or link banking accounts to the system to be used as a choice of payment. The Customer App also allows the customer to add virtual cards. The Customer App includes a marketplace where banks and other third parties can offer virtual credit, debit, or other payment cards that can be used with the system. The Customer can sign up for one or more of those virtual cards as desired.

The system can also be used for peer-to-peer transfers between customers in one embodiment. The customer app includes an option for initiating a peer-to-peer transfer via International Bank Account Number (IBAN) for example. The customer selects the amount to transfer, selects a contact to whom to transfer the money, and then authorizes the transaction.

Payment Applets (Virtual Cards)

Payment applets provide an extra level of security in transactions while still allowing customizability. For each bank account that a customer identifies and registers with the system, the system generates an applet associated with that account. When a customer wishes to pay for a transaction, the customer can simple access the appropriate applet. As a result, financial institutions no longer have to design, stamp, print, and distribute physical cards to a customer when the financial institution wants to issue a credit account, debit card, or prepaid card to the customer. The financial institution need only produce a Payment Applet using the system API instead.

Marketplace

In one embodiment, the system includes a marketplace that functions as a showroom for Payment Applets. Financial institutions, businesses, vendors, and other partners can obtain a verified issuer profile in the marketplace. This allows them to engage system customers and issue payment products (e.g. Payment Applets). The customer can search the verified issuers and their products and choose one or more as desired. In one embodiment, the system may suggest one or more Payment Applets based on the customer history and have it added to their digital wallet. Because customers are already in the system, their information, using the System ID, is associated with any obtained Payment Applet and the user is able to transact right away.

Using the system described above, it is possible to develop a direct link between the customer and the commercial process via the Customer App, the web-based customer app, the POS app, the web-based POS, and the system administration.

Example Computer Embodiment

Figure 7:
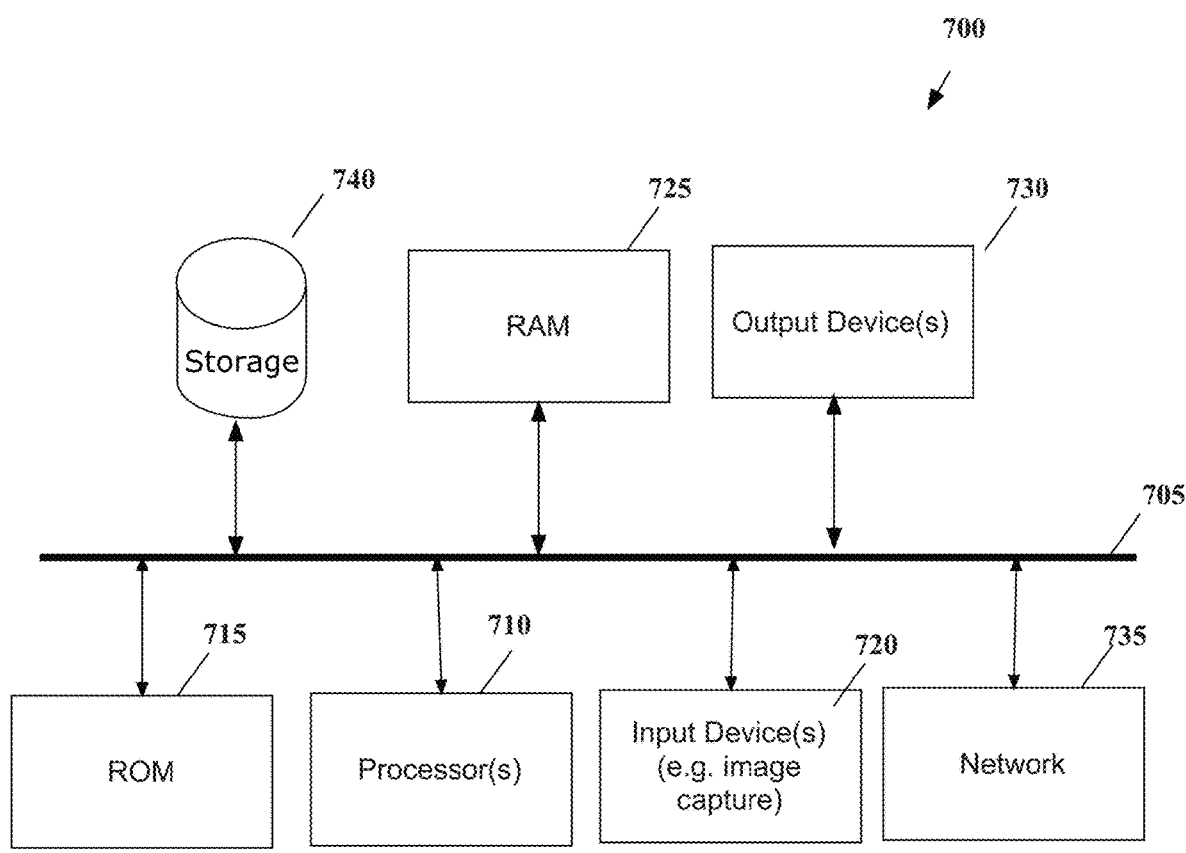
FIG. 7 is an example computer environment of the system.

FIG. 7 illustrates an exemplary a system 700 that may implement the system. The electronic system 700 of some embodiments may be a mobile apparatus. The electronic system includes various types of machine readable media and interfaces. The electronic system includes a bus 705, processor(s) 710, read only memory (ROM) 715, input device(s) 720, random access memory (RAM) 725, output device(s) 730, a network component 735, and a permanent storage device 740.

The bus 705 communicatively connects the internal devices and/or components of the electronic system. For instance, the bus 705 communicatively connects the processor(s) 710 with the ROM 715, the RAM 725, and the permanent storage 740. The processor(s) 710 retrieve instructions from the memory units to execute processes of the invention.

The processor(s) 710 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine readable storage medium (also referred to as machine readable medium). When these instructions are executed by one or more of the processor(s) 710, they cause the processor(s) 710 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 710. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 700, define one or more specific machine implementations that execute and perform the operations of the software programs.

The ROM 715 stores static instructions needed by the processor(s) 710 and other components of the electronic system. The ROM may store the instructions necessary for the processor(s) 710 to execute the processes provided by the system. The permanent storage 740 is a non-volatile memory that stores instructions and data when the electronic system 700 is on or off. The permanent storage 740 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 725 is a volatile read/write memory. The RAM 725 stores instructions needed by the processor(s) 710 at runtime, the RAM 725 may also store the real-time video or still images acquired by the system. The bus 705 also connects input and output devices 720 and 730. The input devices enable the user to communicate information and select commands to the electronic system. The input devices 720 may be a keypad, image capture apparatus, or a touch screen display capable of receiving touch interactions. The output device(s) 730 display images generated by the electronic system. The output devices may include printers or display devices such as monitors.

The bus 705 also couples the electronic system to a network 735. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 18(f) unless the element is expressly recited using the phrase "means for" or, in the case of a method claim, the element is recited using the phrase "step for."

Thus, a method and apparatus for a credit system has been described.

What is claimed is:

1. A method of implementing payment of a transaction between a merchant and a customer comprising:
- entering transaction information about the transaction by the merchant at a merchant point-of-sale (POS) device and wherein the merchant POS device generates a unique merchant code that defines an encrypted memory location in a processing system database, wherein the defined encrypted memory space is associated with the merchant;
- writing the transaction information to the memory location in the processing system;
- scanning the unique merchant code at the merchant by the customer using a customer device;
- sending the transaction information and a request to authorize payment to the customer from the memory location;
- authorizing the payment of the transaction by the customer using the customer device; and,
- deleting the transaction data written to the memory location after the transaction has been completed.

2. The method of claim 1 wherein the merchant POS device is a processing device implementing a POS application.

3. The method of claim 1 wherein the merchant POS device is a processing device accessing a POS web service.

4. The method of claim 1 wherein the customer device is a mobile processing device.

5. The method of claim 1 wherein the code is a QR code.

6. The method of claim 1 wherein the QR code is a static code used for all merchant transactions.

7. The method of claim 1 wherein the QR code is a dynamic code used for the transaction.

* * * * *